(12) United States Patent
Zhang et al.

(10) Patent No.: US 10,375,677 B2
(45) Date of Patent: Aug. 6, 2019

(54) METHOD AND SYSTEM FOR ALLOCATING MEDIA ACCESS CONTROL LAYER RESOURCES IN A WIRELESS COMMUNICATION ENVIRONMENT

(71) Applicant: Apple Inc., Cupertino, CA (US)

(72) Inventors: Hang Zhang, Nepean (CA); Jianglei Ma, Kanata (CA); Ming Jia, Ottawa (CA); Mo-Han Fong, Sunnyvale, CA (US); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 726 days.

(21) Appl. No.: 14/494,659

(22) Filed: Sep. 24, 2014

(65) Prior Publication Data

US 2015/0009943 A1 Jan. 8, 2015

Related U.S. Application Data

(63) Continuation of application No. 13/784,158, filed on Mar. 4, 2013, which is a continuation of application
(Continued)

(51) Int. Cl.
*H04W 72/04* (2009.01)
*H04W 72/00* (2009.01)
(Continued)

(52) U.S. Cl.
CPC ...... *H04W 72/0406* (2013.01); *H04B 7/0413* (2013.01); *H04L 1/1887* (2013.01); *H04L 12/185* (2013.01); *H04L 27/2627* (2013.01); *H04L 61/2069* (2013.01); *H04W 4/08* (2013.01); *H04W 48/10* (2013.01); *H04W 72/005* (2013.01); *H04W 72/04* (2013.01); *H04W 74/004* (2013.01);
(Continued)

(58) Field of Classification Search
CPC .. H04L 27/2647; H04L 5/0048; H04W 56/00; H04W 56/0005; H04W 72/0406; H04J 11/0069
USPC .................................................. 370/252, 329
See application file for complete search history.

(56) References Cited

U.S. PATENT DOCUMENTS 6,101,180 A 8/2000 Donahue et al.
6,690,798 B1 * 2/2004 Dent .................... H04B 7/1855
380/248
(Continued)

OTHER PUBLICATIONS

U.S. Appl. No. 13/784,158, filed Mar. 4, 2013, Hang Zhang.

*Primary Examiner* — Andrew Lai
*Assistant Examiner* — Andrew C Lee
(74) *Attorney, Agent, or Firm* — Meyertons, Hood, Kivlin, Kowert & Goetzel, P.C.

(57) ABSTRACT

A method and system for allocating shareable wireless transmission resources. A resource pool is established. The resource pool is divided into a plurality of physical layer allocation units usable for wirelessly transmitting control information and traffic data. The allocation units are assigned at the media access control layer for the wireless transmission of the control information and traffic data. The system and method of the present invention also allows mobile stations to be dynamically grouped into multicast groupings to reduce system overhead resource requirements.

18 Claims, 2 Drawing Sheets

Related U.S. Application Data

No. 13/093,419, filed on Apr. 25, 2011, now Pat. No. 8,400,976, which is a continuation of application No. 11/435,486, filed on May 17, 2006, now Pat. No. 7,941,150.

(60) Provisional application No. 60/683,223, filed on May 19, 2005.

(51) Int. Cl.

| | | |
|---|---|---|
| *H04L 12/18* | (2006.01) | |
| *H04W 4/08* | (2009.01) | |
| *H04W 48/10* | (2009.01) | |
| *H04B 7/0413* | (2017.01) | |
| *H04L 1/18* | (2006.01) | |
| *H04L 27/26* | (2006.01) | |
| *H04L 29/12* | (2006.01) | |
| *H04W 74/00* | (2009.01) | |
| *H04L 5/02* | (2006.01) | |

(52) U.S. Cl.
CPC ........... *H04W 74/006* (2013.01); *H04L 5/023* (2013.01); *Y02D 30/30* (2018.01)

(56) References Cited

U.S. PATENT DOCUMENTS

| | | | |
|---|---|---|---|
| 6,804,528 B1* | 10/2004 | Laroia | H04L 12/189 |
| | | | 455/503 |
| 6,870,808 B1 | 3/2005 | Liu et al. | |
| 7,012,891 B1 | 3/2006 | Chandran et al. | |
| 7,162,241 B2 | 1/2007 | Kim et al. | |
| 7,308,278 B2 | 12/2007 | Park | |
| 7,317,750 B2* | 1/2008 | Shattil | H04L 25/03834 |
| | | | 375/146 |
| 7,496,096 B1 | 2/2009 | Dong et al. | |
| 8,589,373 B2 | 11/2013 | Mayer | |
| 2001/0025377 A1 | 9/2001 | Hinderks | |
| 2001/0038620 A1 | 11/2001 | Stanwood et al. | |
| 2002/0012327 A1 | 1/2002 | Okada | |
| 2002/0097728 A1 | 7/2002 | Hinderks et al. | |
| 2003/0013451 A1* | 1/2003 | Walton | H04W 16/04 |
| | | | 455/447 |
| 2003/0022683 A1* | 1/2003 | Beckmann | H04W 72/005 |
| | | | 455/518 |
| 2003/0035423 A1 | 2/2003 | Beckmann et al. | |
| 2003/0039225 A1 | 2/2003 | Casati et al. | |
| 2003/0039232 A1 | 2/2003 | Casati et al. | |
| 2003/0095561 A1 | 5/2003 | Hwang | |
| 2003/0103521 A1 | 6/2003 | Raphaeli et al. | |
| 2003/0157899 A1* | 8/2003 | Trossen | H04L 1/0002 |
| | | | 455/69 |
| 2003/0157949 A1 | 8/2003 | Sarkkinen et al. | |
| 2003/0207696 A1* | 11/2003 | Willenegger | H04W 52/40 |
| | | | 455/522 |
| 2004/0017809 A1* | 1/2004 | Park | H04L 12/18 |
| | | | 370/390 |
| 2004/0029616 A1* | 2/2004 | Kim | H04W 4/08 |
| | | | 455/560 |
| 2004/0037237 A1 | 2/2004 | Lalwaney | |
| 2004/0042478 A1 | 3/2004 | Bertagna | |
| 2004/0047322 A1 | 3/2004 | O'Neill | |
| 2004/0082356 A1* | 4/2004 | Walton | H04B 7/022 |
| | | | 455/522 |
| 2004/0092288 A1* | 5/2004 | Moon | H04W 4/06 |
| | | | 455/560 |
| 2004/0100920 A1* | 5/2004 | Ball | H04W 52/04 |
| | | | 370/318 |
| 2004/0116126 A1* | 6/2004 | Cave | H04W 74/002 |
| | | | 455/450 |
| 2004/0116139 A1* | 6/2004 | Yi | H04L 12/189 |
| | | | 455/503 |
| 2004/0120276 A1 | 6/2004 | Golla et al. | |
| 2004/0202164 A1 | 10/2004 | Hooper et al. | |
| 2004/0203714 A1* | 10/2004 | Van Lieshout | H04W 28/12 |
| | | | 455/423 |
| 2004/0213214 A1 | 10/2004 | Jung et al. | |
| 2004/0252662 A1* | 12/2004 | Cho | H04W 74/08 |
| | | | 370/329 |
| 2004/0266461 A1 | 12/2004 | Beckmann et al. | |
| 2005/0007990 A1 | 1/2005 | Beckmann et al. | |
| 2005/0063330 A1* | 3/2005 | Lee | H04W 72/0413 |
| | | | 370/328 |
| 2005/0085265 A1* | 4/2005 | Laroia | H04W 36/0072 |
| | | | 455/560 |
| 2005/0100050 A1 | 5/2005 | Huang et al. | |
| 2005/0107036 A1 | 5/2005 | Song et al. | |
| 2005/0114324 A1 | 5/2005 | Mayer | |
| 2005/0114478 A1 | 5/2005 | Popescu et al. | |
| 2005/0120097 A1* | 6/2005 | Walton | H04B 7/2643 |
| | | | 709/220 |
| 2005/0129058 A1* | 6/2005 | Casaccia | H04L 1/1671 |
| | | | 370/464 |
| 2005/0135291 A1 | 6/2005 | Ketchum et al. | |
| 2005/0135308 A1 | 6/2005 | Vijayan et al. | |
| 2005/0135416 A1 | 6/2005 | Ketchum et al. | |
| 2005/0136972 A1 | 6/2005 | Smith et al. | |
| 2005/0163106 A1* | 7/2005 | Vaittinen | H04W 76/064 |
| | | | 370/352 |
| 2005/0165949 A1* | 7/2005 | Teague | H04L 1/1664 |
| | | | 709/236 |
| 2005/0219999 A1* | 10/2005 | Kim | H04L 1/0003 |
| | | | 370/207 |
| 2005/0238016 A1 | 10/2005 | Nishibayashi et al. | |
| 2005/0249141 A1 | 11/2005 | Lee et al. | |
| 2005/0270975 A1* | 12/2005 | Meylan | H04L 47/14 |
| | | | 370/229 |
| 2005/0276237 A1 | 12/2005 | Segal et al. | |
| 2005/0281208 A1* | 12/2005 | Dorenbosch | H04L 12/189 |
| | | | 370/270 |
| 2005/0281209 A1* | 12/2005 | Cai | H04W 74/00 |
| | | | 370/270 |
| 2006/0002386 A1 | 1/2006 | Yik et al. | |
| 2006/0007930 A1* | 1/2006 | Dorenbosch | H04L 12/1886 |
| | | | 370/390 |
| 2006/0056427 A1 | 3/2006 | Sato | |
| 2006/0126590 A1 | 6/2006 | Putcha et al. | |
| 2006/0153061 A1* | 7/2006 | Nishio | H04L 5/0046 |
| | | | 370/208 |
| 2006/0166653 A1 | 7/2006 | Xu et al. | |
| 2006/0233171 A1 | 10/2006 | Murray et al. | |
| 2009/0080359 A1 | 3/2009 | Song et al. | |
| 2010/0182944 A1 | 7/2010 | Kish | |

\* cited by examiner

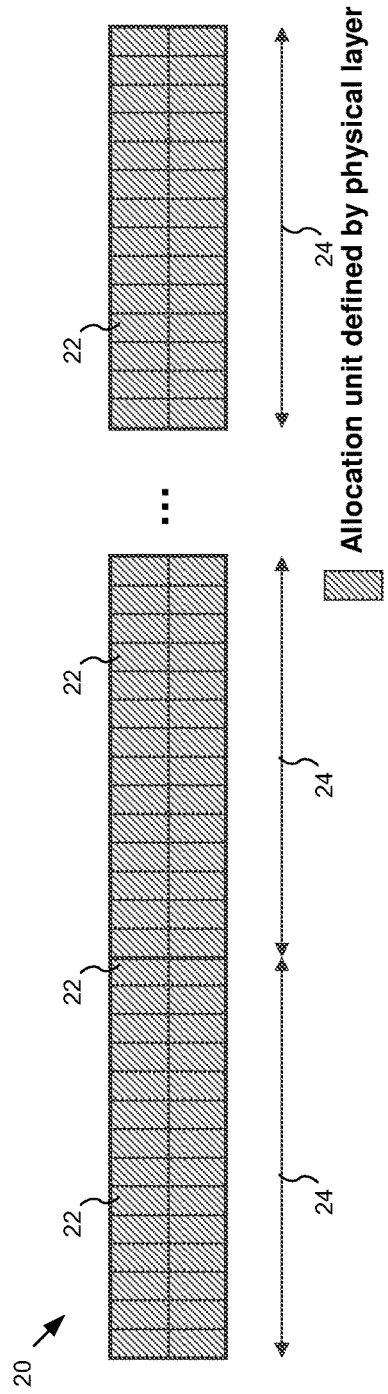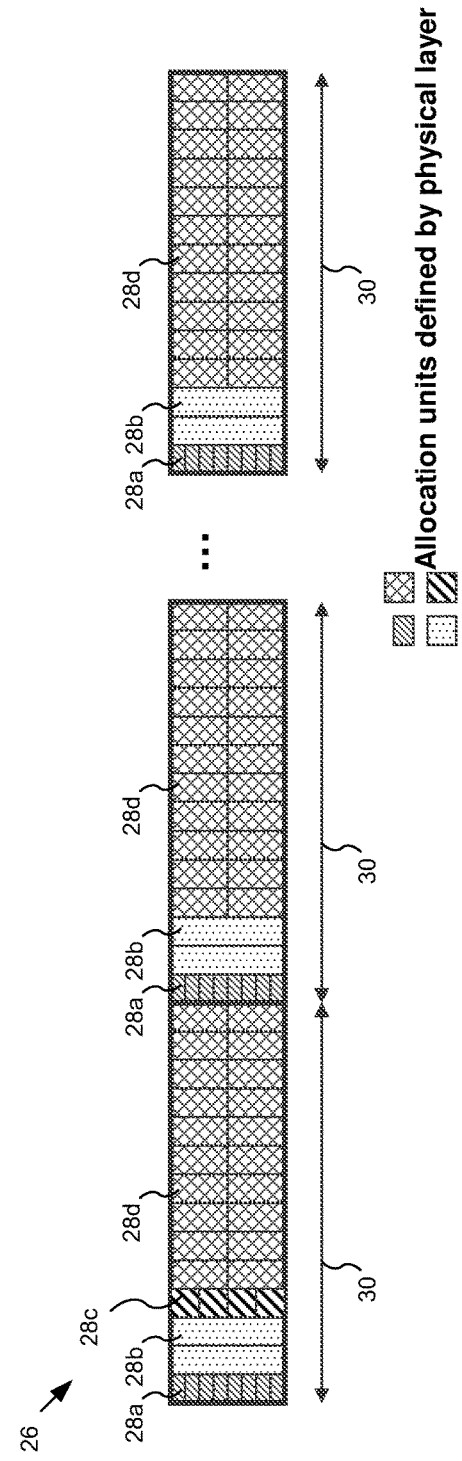

METHOD AND SYSTEM FOR ALLOCATING MEDIA ACCESS CONTROL LAYER RESOURCES IN A WIRELESS COMMUNICATION ENVIRONMENT

CROSS-REFERENCE TO RELATED APPLICATIONS

This application is a continuation of U.S. patent application Ser. No. 13/784,158, filed Mar. 4, 2013, which is a continuation of U.S. patent application Ser. No. 13/093,419, filed Apr. 25, 2011, which is a continuation of and claims priority to U.S. patent application Ser. No. 11/435,486, filed May 17, 2006, entitled METHOD AND SYSTEM FOR ALLOCATING MEDIA ACCESS CONTROL LAYER RESOURCES IN A WIRELESS COMMUNICATION ENVIRONMENT, now U.S. Pat. No. 7,941,150, which claims priority to U.S. Provisional Patent Application Ser. No. 60/683,223, filed May 19, 2005, entitled METHODS AND SYSTEMS FOR ALLOCATING MAC LAYER RESOURCES, the entire contents of all of which are herein incorporated by reference.

STATEMENT REGARDING FEDERALLY SPONSORED RESEARCH OR DEVELOPMENT

N/A

FIELD OF THE INVENTION

The present invention relates to wireless communications, and in particular to a method and system for dynamically allocating control and traffic media access control layer resources at the packet level.

BACKGROUND OF THE INVENTION

Wireless communication networks, such as cellular networks, operate by sharing resources among the mobile stations operating in the communication network. As part of the sharing process, resources relating to which channels, codes, etc., are allocated by one or more controlling devices within the system. These resources can be allocated at different levels depending on the type of sharing that must occur and the underlying network protocols of the system.

Many existing wireless communication networks, such as those operating under the code division multiple access ("CDMA") or the UMTS standards allocate media access control ("MAC") layer resources for control signaling and user/data traffic transmission at the circuit level. However, this arrangement is inefficient because MAC layer resources may be allocated for the duration of a communication session, even though there may be periods of inactivity during the session. For example, voice over Internet protocol ("VoIP") communication sessions typically have long silent periods during which the communication resources go unused. Some estimates place resource inactivity at 60% of the total communication session time. As such, once MAC layer resources are allocated for circuit-based (also referred to as "connection-based") communication sessions, the resources can not be used for other signaling or traffic, even if the sessions are idle. It is therefore desired to have a MAC resource allocation arrangement in which resources for both traffic and control signaling can be allocated at a more granular level than merely at the circuit/connection level, for example, at the packet level.

However, even if MAC layer resources could be allocated at the packet level, this increase in allocation effort means that more processing and signaling overhead resources within the wireless communication system are required. This is the case because signaling between the mobile station and the base station are required so that each device knows what MAC layer resources it should use (or are being used). As such, even if the MAC layer resource allocation problem was solved, the result would likely be an increased use of other resources to allocate the MAC layer resources more efficiently. Accordingly, it is also desired to have a system and method that allows both the more granular allocation of MAC layer resources as well as the efficient allocation of these MAC layer resources.

Given the size and cost of implementation of wireless communication network hardware, system providers are hesitant to spend the money as well as address the network outage time that results to swap out hardware to upgrade their networks, even if such hardware change might result in improved efficiency. This is also the case where completely new protocol environments are proposed such that network designers and develops must learn anew and adopt the new ground-up protocol. As such, it is desirable to have a method and system that can enhance an existing protocol.

SUMMARY OF THE INVENTION

The present invention advantageously provides a method and system for dynamically allocating MAC layer resources in a wireless communication environment in a manner that also efficiently allocates these resources with respect to processing and signaling resource overhead. The method and system of the present invention can be implemented as an enhancement to existing wireless communication protocols such as evolution data-only ("EV-DO") and orthogonal frequency division multiplexing ("OFDM"), including variants such as broadband OFDM ("B-OFDM") and multiple-input multiple-output B-OFDM ("B-OFDM-MIMO").

In accordance with one aspect, the present invention provides a system for allocating shareable wireless transmission resources in which a station establishes a resource pool. The resource pool is divided into a plurality of physical layer allocation units usable for wirelessly transmitting control information and traffic data. The station assigns allocation units at a media access control layer for the wireless transmission of the control information and traffic data.

In accordance with another aspect, the present invention provides a method for allocating shareable wireless transmission resources in which a resource pool is established. The resource pool is divided into a plurality of physical layer allocation units usable for wirelessly transmitting control information and traffic data. Allocation units are assigned at the media access control layer for the wireless transmission of the control information and traffic data.

In accordance with still another aspect, the present invention provides a method for grouping control information for wireless communication with mobile devices. One or more multicast groups are defined. Each of the one or more multicast groups are defined by a multicast group ID and a list of member mobile stations. At least a part of the control information is transmitted by multicasting to a multicast group ID.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a block diagram of an exemplary downlink resource pool constructed in accordance with the principles of the present invention;

FIG. 3 is a block diagram of another exemplary downlink resource pool constructed in accordance with the principles of the present invention.

DETAILED DESCRIPTION OF THE INVENTION

Figure 1:
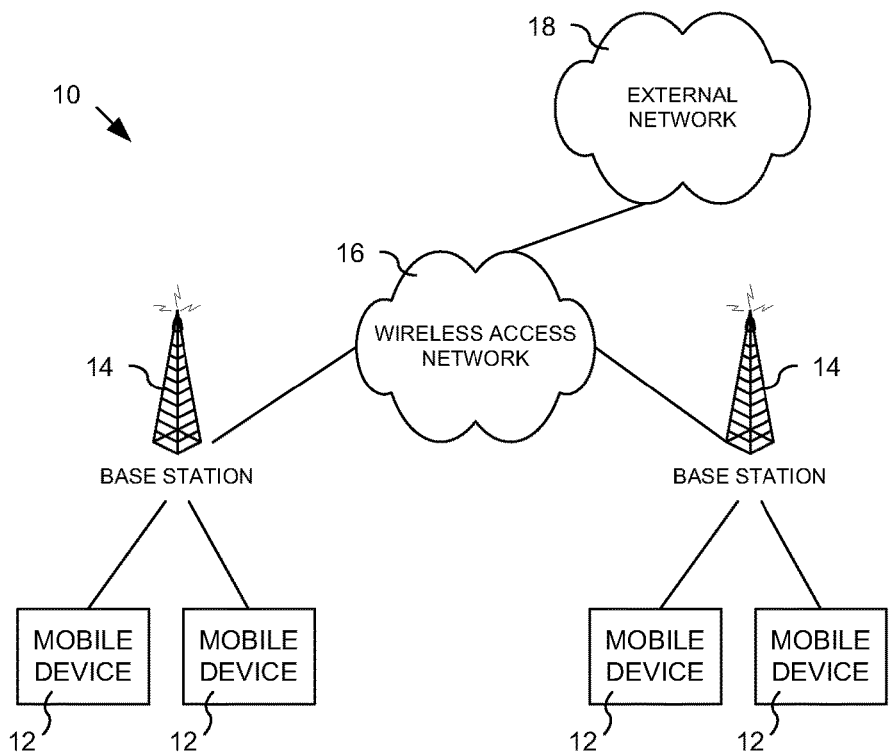
FIG. 1 is a block diagram of a communication system constructed in accordance with the principles of the present invention.

Referring now to the drawing figures in which like reference designators refer to like elements, there is shown in FIG. 1 a block diagram of a wireless communication system constructed in accordance with the principles of the present invention and designated generally as "10". Communication system 10 preferably includes one or more mobile stations 12. Mobile stations 12 can be any wireless device capable of performing the functions herein, including but not limited to handheld wireless devices such as cellular phones, PDAs, etc., wireless tower computers, wireless vehicular mounted phones and wireless laptop computers. Mobile stations 12 are in communication with one or more base stations 14. Base stations 14 communicate via wireless access network 16. External network 18 is coupled to wireless access network 16 and allows communication to and from wireless access network 16 and other local devices such as mobile stations 12. Wireless network 16 facilitates communication between base stations 14 themselves and/or external services available via external network 18 such as Internet access, VoIP services and the like. Arrangements for communication within and between wireless access network 16 and external network 18 are known.

Wireless communication between mobile stations 12 and base stations 14 are described in more detail herein, but include the provisioning and use of resources at the MAC layer level. Each of mobile stations 12 includes a central processing unit, volatile and non-volatile storage (memory) and a wireless communication section, described below in detail, which receives and transmits wireless communication signals to and from base stations 14. Similarly, base stations 14 include a central processing unit, volatile and non-volatile storage (memory) and a wireless communication section. These wireless communication sections include the hardware and software used to implement the features and functions of the present invention. Mobile stations 12 and base stations 14 can be of the type operable in accordance with any of a variety of technologies, such as EV-DO and various OFDM technologies such as B-OFDM and MIMO-based OFDM.

Of note, an embodiment of the invention described herein provides a method and system for allocating MAC layer resources in a wireless communication system operating in accordance with the code division multiple access ("CDMA") 1×EV-DO standard which is incorporated herein by reference. Such allocation, and the corresponding features can be performed by base station 14 and/or mobile station 12 or any other suitable device within wireless access network 16. It should be noted that the present invention is not limited in this regard, and the system and methods described herein are equally applicable to wireless communication systems operating in accordance with various other standards including the high speed OFDM packet access ("HSOPA") 3GPP standard. Also of note, references to uplink ("UL") communications refer to communications from mobile station 12 to base station 14 and references to downlink ("DL") refer to communications from base station 14 to mobile station 12.

An exemplary downlink resource allocation scheme for the MAC layer constructed in accordance with the principles of the present invention is described with reference to FIG. 2. As is shown in FIG. 2, downlink resources include downlink resource pool 20 which is divided into a plurality of allocation units 22. Allocation units 22 are defined by the OSI physical layer. Resources can be allocated for control information and/or traffic, e.g., user data. Downlink resource pool 20 is arranged into a multitude of intervals 24 in which each interval represents a transmission time interval ("TTI"), transmission slot or scheduler interval depending on the implementing technology. For ease of explanation, these terms are collectively referred to as "TTI." Of note, although downlink resource pool 20 is shown as a two-dimensional space in which the allocation units and pool are divided in time, the downlink resource pool can be further divided into multi-dimensional space such as time, frequency, code, layer, space, etc. In addition, although FIG. 2 shows similarly sized allocation units, it is contemplated that different types of allocation units, for example allocation units that differ in size, can be defined within the physical layer.

Keeping the physical layer arrangement described above in mind, it is observed that downlink resource usage at the MAC layer can be fully or semi-shared. With respect to full sharing, a system access channel ("SACH") is provided in every TTI. A fixed number of allocation unit(s) are reserved and used for transmitting key information such as information on how to decode the remaining part of the TTI, thereby enabling mobile stations 12 to understand how to process the remaining portion of the TTI. All remaining available downlink resources for the MAC layer provided by the physical layer can be used dynamically depending on demand. As noted above, the physical resources can be allocated within the MAC layer for any type of service, including control and traffic services. Because the allocation is dynamic, there is no dedicated physical control or data channel.

With respect to the semi-sharing concept, the SACH is provided in every TTI and a fixed number of allocation unit(s) are reserved for transmitting key information such as occurs with respect to full sharing, described above. To enable power efficient operation for mobile stations 12 that are not active, some fixed physical resource may be dedicated to alert idle/sleeping mobile stations 12. All remaining available resources can be used as within the full-sharing arrangement described above. Of note, the size of the physical resource used for alerting idle mobile stations 12 can be updated slowly based on traffic statistics. This update can be broadcast to all mobile stations 12 within the communication region.

Uplink resource allocation is described with reference to FIG. 3. FIG. 3 shows uplink resource pool 26 arranged with four different types of allocation units in a two-dimensional space. Uplink resource pool 26 includes allocation units 28a, 28b, 28c and 28d defined by the OSI physical layer. Similar to the downlink, these allocation units are arranged into intervals 30. The uplink resource provided to the MAC layer by the physical layer is viewed as the uplink resource pool 26 shown in FIG. 3. As with downlink resource allocation, uplink resource pool can be arranged into a multi-dimensional space, e.g., time, frequency, code, layer, space, etc. Also as with downlink resource allocation, uplink resource allocation can be arranged into multiple types of allocation units which can be different in size. Accordingly, although FIG. 2 shows a single allocation unit for downlink resource allocation and FIG. 3 shows four types of allocation units for uplink resource allocation, the present invention is not limited to such. Downlink resource allocation can be arranged in multiple units and/or the uplink resource allocation can be arranged into a single type of allocation unit, etc.

It is contemplated that all available uplink resources within the MAC layer (as provided by the physical layer) can be semi-statically partitioned into multiple logical MAC resources. As an example of this arrangement is shown in FIG. 3 with the grouping of the allocation units into four groups, 28a-28d. The partition arrangements can be broadcast through a system configuration method. For example, allocation units 28c can be arranged as a fast feedback pool. The fast feedback pool includes multiple resource units, of a particular type, which are few in number and occupy a part of the payload portion of the TTI. Fast feedback pool allocation units enable mobile stations 12 to provide timely, small-sized units of feedback information such as channel quality, and feedback relating to MIMO operation.

Allocation units such as allocation units 28a can be arranged into an ACK pool. This pool includes multiple resource units used to provide feedback, for example, one bit of information in the payload portion of the TTI the ACK pool enables mobile station 12 to provide feedback for downlink H-ARQ operation.

A ranging pool, for example allocation units 28b, includes multiple resource units. The ranging pool enables mobile stations 12 to perform uplink time, power and frequency adjustment as well as requesting uplink resources from base stations 14. The remainder of the allocation units, shown as allocation units 28d, represent the uplink traffic pool and enable mobile stations 12 to send uplink messages and traffic to base stations 14. Of note, all pooled resources can be assigned on an as-needed or demand basis among multiple mobile stations 12, with the allocation lasting one or more TTIs, e.g., intervals 24 and/or 30.

As noted above, allocation units can be grouped and assigned on a packet or as needed basis. The present invention contemplates enhancing resource assignment signaling efficiency through the use of downlink multicast grouping. With downlink multicast grouping, multiple mobile stations 12 sharing certain commonalities can be grouped as a multicast group for enhancing MAC layer resource assignment signaling efficiency, for example transmitting at least a part of the control information by multicasting to a multicast group ID. Under this arrangement, a multicast group is defined by a multicast group ID along with a listing of the member mobile stations 12.

In a typical unicast arrangement a 10-bit user ID, enough to support 1,024 mobile stations 12, is assigned to a mobile station. As such, each assignment must provide ten bits of space for mobile station 12 identification. This arrangement consumes a lot of resources. However, grouping mobile stations 12 dynamically based on usage allows a significant reduction in the required resources because fewer than ten bits per assignment can be used. For example, consider an arrangement which has two groups of mobile stations 12 such as a group of mobile stations 12 using VoIP and another group of mobile stations 12 using IP e-mail. If there are ten total mobile stations 12 of which three mobile stations 12 are in the VoIP group and seven mobile stations 12 are in the IP e-mail group, the VoIP group requires two bits to identify a mobile station 12 (sub-user) within the group and the IP e-mail group requires three bits to identify sub-users within the group. As such, representing the VoIP group and a sub-user requires two bits plus the number of bits needed to support and identify the groups. In this case there are two groups so only a single bit is needed for the group identification. Accordingly, only three total bits are needed to identify a multicast frame which identifies the VoIP group and a particular mobile station 12 within that group. Similarly, complete identification within the IP e-mail multicast group requires four bits, one to identify the IP e-mail group and the remaining three to identify a mobile station 12 within that group. Accordingly, the present invention advantageously allows the allocation of resources on a group-by-group basis and in a manner in which the number of bits needed to identify sub-users within a group can vary depending on the quantity of sub-users within that group.

The present invention contemplates three different methods under which multicast groups can be generated, namely, static, semi-static and dynamic. Each is explained in detail. The static, which is OSI upper layer oriented and semi-static, which is OSI layer 2 (MAC layer) oriented, groupings apply equally to uplink and downlink multicast grouping. Dynamic grouping differs slightly between downlink multicast grouping and uplink multicast grouping. With upper layer-oriented multicast grouping, multicast IDs are pre-defined for certain services, e.g., VoIP, e-mail, etc., or are pre-defined for certain mobile stations 12 that are in the same state, e.g., idle. Members of a multicast group are updated when either a mobile station 12 starts or stops the service, or a mobile station 12 enters or exits a state within a service. Member updating in a multicast group, is broadcast or unicast through signaling which, in the case of static multicast groups is not very frequent.

With OSI layer 2 oriented semi-static multicast grouping, mobile stations 12 are temporarily grouped by their OSI layer 2 commonality, e.g., downlink non-empty buffers, etc. Multicast group creation and/or update can be accomplished by broadcast or unicast through signaling, including the multicast group identification as well as identification of all member mobile stations 12. A group update can be accomplished relatively quickly as compared with static multicast grouping, for example, every few seconds depending on downlink traffic.

Dynamic downlink multicast grouping is OSI layer 1, e.g., physical layer, oriented. Under this arrangement, mobile devices sharing predetermined physical layer commonality, for example, the same data rate, are temporarily grouped. The multicast group creation and update can be accomplished by broadcast/unicast or signaling that includes the multicast group ID as well as identification of all member mobile stations 12. Multicast group creation and updating can also be accomplished by ad-hoc auto-grouping through which a mobile station 12 joins a group based on its preference. For example, a multicast group could include all mobile stations 12 that request the same downlink data rate. By indicating a preferred downlink data rate in the form of a data rate index, a mobile station 12 automatically joins a group that is identified by this data rate. As such, the data rate index can be used as the multicast group identification. As is readily observable, the updating of multicast groups can be accomplished every TTI, thereby allowing a very dynamic grouping structure.

Uplink multicast grouping strategy for dynamic physical layer oriented grouping is similar to that described above with respect to dynamic downlink multicast grouping with the exception that ad-hoc auto-grouping is not applicable to uplink multicast grouping, As with downlink multicast grouping, dynamic uplink multicast grouping allows for temporarily grouping mobile stations 12 sharing some predetermined physical layer commonality such as the same data rate, same H-ARQ, etc.

The previously described multicast grouping methods result in a reduction of overhead resource requirements. Of note, a mobile station 12 can participate in one or more multicast groups, accordingly, one or more multicast group IDs can be used to identify a mobile station 12. If multicast group information is known to all mobile station members through some form of update message that includes the multicast ID and listing of member mobile devices, certain efficiencies can be obtained. For example, a mobile device can be identified at the time the resource is allocated simply by one or more multicast group IDs. If all mobile stations 12 in the group are allocated resources, it is not necessary to include the listing of mobile device IDs, assuming the order of mobile devices is the same as in the multicast group update message that would have been previously sent. If not all mobile stations 12 in a group are allocated resources, a bit map or off/on flag can be used to indicate whether the resource to a particular mobile station 12 is assigned.

When downstream interval usage code ("DIUC"), e.g., downlink modulation and a code scheme index, is used to create a multicast group, each physical burst can be described in the main MAP (resource assignment) message. The descriptions include the unicast/multicast ID, the data rate index and location of the physical burst. Of course, the unicast/multicast ID could also be the data rate index for an ad-hoc auto-grouping. Within the physical burst including data from multiple mobile stations 12, a burst-MAP provides the mobile station ID, MIMO control information, H-ARQ control information, packet data unit ("PDU") length, etc. In this way, the main MAP length is reduced. Because MAP length is a significant contributor to MAC layer overhead, reducing the MAP length reduces MAC layer overhead.

The multicast grouping arrangements described above also advantageously allow power savings within mobile stations 12. When combined with main MAP and the sub-MAP concepts described herein, the multicast group ID can assist a mobile station 12 to determine which sub-MAP to monitor. Of note, the MAP concept is known to those of skill in the art, and is not described herein in detail. When a physical burst includes short data packet such as occurs in VoIP communications, from multiple mobile stations 12 sharing the same modulation and code scheme, a broadcast ID can be used as may be known in the current OFDM standards for this physical burst. As such, all mobile stations 12 need to decode the physical burst. A multicast grouping ID defined for short packet or VoIP services can be used here to prevent other mobile devices who do not belong to this group to decode the physical burst. By avoiding the physical burst decode, power savings result.

In order to facilitate MAC layer resource allocation, embodiments of the present invention implement protocol enhancements over 1×EV-DO such as for 3GPP2 environments. These enhancements may include enhancements within the B-OFDM-MIMO environment. Of note, although the following is explained with reference to B-OFDM-MIMO, it is understood that the invention can be implemented in any B-OFDM environment and is not relegated to the use of MIMO.

Figure 4:
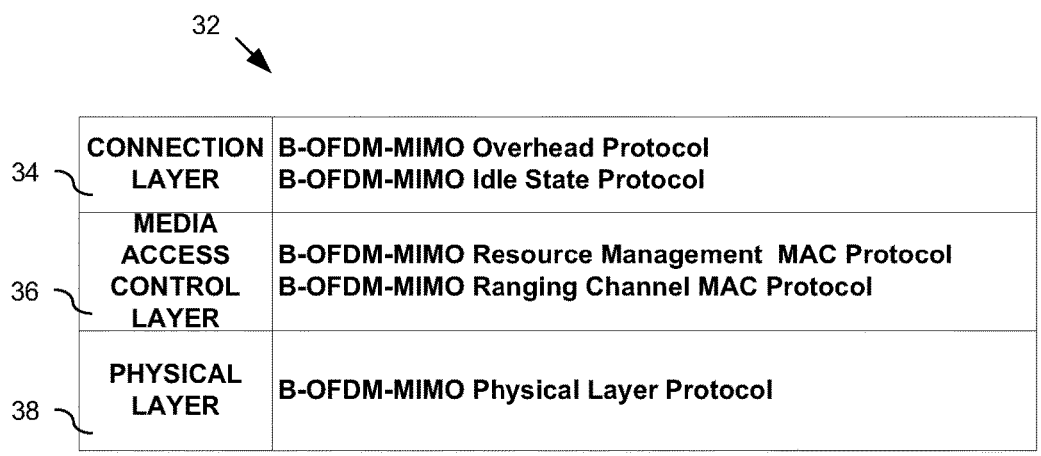
FIG. 4 is a table showing protocol enhancements used for implementation of the present invention.

FIG. 4 shows the enhancements to various layers within B-OFDM-MIMO. Table 32 shows that, at connection layer 34, B-OFDM-MIMO overhead and B-OFDM-MIMO idle state protocol functions are used. The B-OFDM-MIMO overhead protocol provides broadcast messages including information on the B-OFDM-MIMO system as well as uplink and downlink resource pool definitions such as resource pools 20 and 26 in FIGS. 2 and 3. The B-OFDM-MIMO idle state protocol provides procedures that a B-OFDM-MIMO enabled mobile station 12 and a B-OFDM-MIMO access network, e.g., a station 14, follow when a connection is not open. These procedures include efficient paging mechanisms, location updates and periodic ranging.

Media access control layer 36 includes functions for B-OFDM-MIMO resource management and a B-OFDM-MIMO ranging channel MAC protocol. The B-OFDM-MIMO resource management MAC protocol implements uplink and downlink resource management as described above, and generates "assignment" messages to indicate how the resources will be allocated. The B-OFDM-MIMO ranging channel MAC protocol establishes the management ranging procedure such as the loading indication and detection indication. Physical layer 38 implements an enhanced B-OFDM-MIMO physical layer protocol which establishes physical layer procedures for implementing the present invention as is described herein.

The present invention, as described above, addresses how resources are to be allocated, how the allocation is established, how efficiencies can be obtained by grouping, etc. The configuration information relating to these aspects of the invention must be communicated among mobile stations 12 and base stations 14. Operational options of system configuration information can be transmitted with a fixed cycle, which is convenient for system parameter synchronization of non-active mobile stations 12, or transmitted at a non-fixed cycle, which is convenient for system description updates for timely adaptation to traffic patterns, mobility statistic changes and interference avoidance.

When transmitting with a fixed cycle, a sector description message can be used as part of the overhead protocol in connection layer 34. The sector description message includes a sector ID, geographic information, neighbor information, and information on air interface resource usage, e.g., uplink and downlink channel classifications and definitions. In addition, the control channel MAC protocol, not shown in FIG. 4 but present in MAC layer 36, is modified to enable fixed cycle transmissions.

If configuration information is transmitted with a non-fixed cycle, the sector parameter message can be implemented such that it includes the sector ID, geographic information and neighbor information and transmitted at least once every N sector parameter B-OFDM-MIMO frames. Transmitting with a non-fixed cycle is also implemented with downlink and uplink description messages. The downlink description message is implemented as part of the downlink traffic channel MAC protocol which is part of the media access control layer 36 and is not shown in FIG. 4. Similarly, the uplink description message is implemented as part of the uplink traffic channel MAC protocol within media access control layer 36. The downlink description message includes downlink resource usage definition and is transmitted at least once every M downlink description B-OFDM-MIMO frames. The uplink description includes uplink resource usage definitions as discussed above, and is transmitted at least once every X uplink description B-OFDM-MIMO frames.

Non-fixed cycle transmission further includes a quick configuration message which includes the sector ID, sector signature, downlink description signature, uplink description signature and corresponding next transmission schedule. The quick configuration message is transmitted at a fixed cycle which is more frequent than the sector parameter, downlink description, uplink description message transmission.

In order to convey how resources are assigned, the present invention provides downlink resource assignment description and uplink resource assignment description protocol enhancements. With respect to downlink resource assignment description, the present invention includes a frame control message as part of the B-OFDM-MIMO resource management MAC protocol. The frame control message is transmitted at the very beginning of each B-OFDM-MIMO frame. It establishes the fixed physical layer occupancy as well as known physical layer parameters. It also occupies a fixed portion of the MAC payload and includes the frame number, establishes physical occupancy of the anchor message length and also includes an alert message indicator relating to the alert of idle mobile stations 12.

The anchor message includes a pointer to the alert message, described below. The pointer to the alert message includes an offset plus a variable length which depends on a number of assigned active mobile stations 12. One bit is provided per mobile station. The anchor message also includes pointers to the overhead message, if any, to the alert message and to the assignment message, also discussed below. The alert message, also part of downlink resource assignment description provides downlink traffic addressing so that mobile devices 12 that are idle can be alerted when there is information to be transmitted and/or received. The assignment message, also part of the downlink resource assignment description aspect of the present invention, provides downlink data transmission parameters, including a modulation and coding scheme ("MCS") index, which is determined based on feedback from mobile stations 12, H-ARQ parameters, MIMO parameters based on feedback from mobile stations 12 and resource allocation, e.g., ID of allocation units.

Uplink resource assignment descriptions include the alert message and assignment message. However, while the downlink resource assignment for these message relates to downlink traffic addressing and downlink data transmission parameters, the uplink resource assignment description aspects for the alert message and assignment message relate to link traffic addressing and uplink data transmission parameters.

The protocol enhancement aspect of the present invention also provides for enhanced mobile station 12 addressing to facilitate the addressing arrangements discussed above. In accordance with the present invention, the 7-bit MAC index known as part of the B-OFDM-MIMO protocol can be used to identify active mobile stations 12. In this regard, the MAC index assignment method can be used. The MAC index can be unicast, multicast or broadcast. When assigned as a unicast ID, the ID is used for both uplink and downlink communications. In other words, the unicast ID is used to identify the mobile station 12, and not the direction of communication. Further, the MAC index is used in the assignment message for downlink broadcast and multicast, and in both the uplink and downlink for unicast traffic.

An aspect of resource allocation involves an indication of the downlink data rate. The data rate can be determined by mobile station 12 or base station 14. If the data rate is determined by mobile station 12, the explicit data rate indication is not included in the assignment message. In contrast, if the data rate is determined by base station 14, the explicit data rate indication appears in the assignment message. Data rate determination can be static, i.e. it is negotiated at session set up or dynamic, i.e. the data rate is determined on a TTI-by-TTI basis. For dynamic data rate determination, the present invention contemplates the use of a flag to indicate the inclusion of data rate indication. For example, if the data rate determined by base station 14 is the same as that indicated by mobile station 12, no explicit data rate indication is needed. Otherwise, the data rate indication appears in the assignment message.

Another aspect for implementing resource allocation at the MAC level is the use of feedback so that base station 14 has some idea as to various performance issues relating to the wireless communication. As such, the present invention provides a feedback message which allows a mobile station 12 to provide information relating to downlink data rate, cell/sector selection, MIMO-related feedback and permutations. This feedback data can be provided in the feedback message via a feedback channel autonomously used by mobile station 12 or in response to a feedback pooling message received from base station 14. The feedback pooling message is an inquiry sent to mobile station 12 that allows base station 14 and the remainder of components in the system to obtain the feedback data.

The present invention also provides an uplink bandwidth request message. The uplink bandwidth request message is used by a mobile station 12 to request bandwidth resources for uplink transmission. Of note, all available uplink resources are shared among all active mobile stations 12, and, in accordance with the present invention, it is not necessary for an active mobile station 12 to have dedicated uplink resources. Accordingly, uplink resource usage can be provided on a request/grant basis. The band width request message includes data necessary for identification of the mobile station 12 requesting the band width as well as an indication of how much band width is being requested.

The present invention also provides for time power and frequency adjustment and network initial access. Regarding the latter, an access request message is provided which is used for initial access and non-assisted handoff after a successful time, power and frequency ("TPF") adjustment. The access requested message also includes the mobile device ID.

TPF adjustments are provided by a TPF adjustment message that controls TPF transmission and periodic pooling. The TPF adjustment message provides recommended timing, power and frequency adjustments. A TPF adjustment acknowledgement message is used to acknowledge receipt of the TPF adjustment message. This is used for ranging purposes after a successful TPF adjustment.

The present invention provides a method and system that allows MAC layer resources to be allocated on a dynamic, e.g., per TTI, basis. In accordance therewith, the present invention provides for the grouping of mobile stations 12 into multicast groups to increase resource efficiency by decreasing the amount of control information that must be communicated between mobile stations 12 and base stations 14. Further, the present invention provides enhancements to known wireless communication protocols to facilitate implementation of the resource allocation and multicast group aspects of the present invention.

Unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of portioning wireless transmission resources, the method comprising:
at a base station:
establishing an uplink resource pool in a first time interval, the uplink resource pool being divided into a plurality of physical layer allocation units usable for wirelessly transmitting control and traffic data from mobile stations; wherein the physical layer of the uplink is based on a broadband orthogonal frequency domain multiplexing (OFDM) technology;
partitioning the allocation units of the uplink resource pool, wherein the resource partitioning is a temporary arrangement transmitted in at least one system information message, wherein the resource partitioning configuration includes at least partitions of:
one or more feedback partitions configurable to receive at least channel quality feedback, feedback related to multiple input multiple output (MIMO) operation, and hybrid automatic repeat request (HARD) feedback at the base station from one or more mobile stations; and
a first signaling partition configurable to receive signaling at the base station from one or more mobile stations, where the signaling is used for at least performing a uplink timing adjustment for mobile station transmissions;
adding a mobile station to a first multicast group based on a common parameter, wherein the first multicast group is defined by a first multicast group ID, wherein the first multicast group ID is defined by the base station for temporarily grouping mobile stations sharing the common parameter and a particular packet type, service, or mobile station state;
transmitting an uplink resource assignment specific to the mobile station in a multicast control message, wherein the multicast control message is directed to the first multicast group defined by the first multicast group ID, wherein the multicast control message identifies a plurality of mobile stations of the first multicast group that are each assigned respective resources; and
transmitting a second uplink resource assignment in a second multicast control message, wherein a second multicast control message is directed to a second multicast group is defined by a second multicast group ID, wherein the mobile station is not a member of the second multicast group, wherein the second multicast group ID is used to prevent the mobile station from decoding the second multicast control message.

2. The method of claim 1, wherein the at least one system information message is broadcast on at least every N radio frames, wherein N is an integer.

3. The method of claim 1, wherein the at least one system information message further comprises a sector ID, geographic information, and neighbor information.

4. The method of claim 1, wherein the resource partitioning configuration further comprises a resource pool for uplink messages and traffic to the base station.

5. The method of claim 4, wherein the resource pool for uplink messages and traffic to the base station is the remainder of uplink resources not included in the one or more feedback partitions and the first signaling partition in the first time interval.

6. The method of claim 4, wherein the uplink resource assignment and the second uplink resource assignment are reassignable each time interval.

7. The method of claim 6, wherein uplink resource assignments are on an on demand basis and for one or more time intervals.

8. The method of claim 1, further comprising:
establishing a downlink resource pool in the first time interval, the downlink resource pool being divided into a plurality of physical layer downlink allocation units usable for wirelessly transmitting downlink control information and downlink traffic data, wherein the physical layer of the downlink is based on a broadband OFDM technology; and
assigning downlink allocation units for the wireless transmission of the downlink control information and downlink traffic data, wherein the downlink allocation units are arranged into time intervals, wherein the assigned downlink allocation units are reassignable each time interval.

9. The method of claim 8, further comprising:
reserving a predetermined quantity of downlink allocation units for a portion of the downlink control information defining how an interval is decoded.

10. A method of receiving a configuration of wireless transmission resources, the method comprising:
at a mobile station:
receiving at least one system information message from a base station comprising resource partitioning of an uplink resource pool in a first time interval, wherein the uplink resource pool is divided into a plurality of physical layer allocation units usable for wirelessly transmitting control and traffic data from mobile stations, wherein the physical layer of the uplink is based on a broadband orthogonal frequency domain multiplexing (OFDM) technology, wherein the resource partitioning of the allocation units of the uplink resource pool, wherein the resource partitioning configuration comprises at least partitions of:
one or more feedback partitions configurable to receive at least channel quality feedback, feedback related to multiple input multiple output (MIMO) operation, and hybrid automatic repeat request (HARD) feedback at a base station from one or more mobile stations; and
a first signaling partition configurable to receive signalling at the base station from one or more mobile station, where the signalling is used for at least performing a uplink timing adjustment for mobile station transmissions;
joining a first multicast group based on a common parameter, wherein the first multicast group is defined by a first multicast group ID, wherein the first multicast group ID is defined for temporarily grouping mobile stations sharing the common parameter and a particular packet type, service type, or mobile station state;
receiving an uplink resource assignment specific to the mobile station in a multicast control message, wherein the multicast control message is directed to the first multicast group defined by the first multicast group ID, wherein the multicast control message identifies a plurality of mobile stations of the first multicast group that are each assigned respective resources; and
not decoding a second uplink resource assignment in a second multicast control message, wherein a second multicast control message is directed to a second multicast group defined by a second multicast group ID, wherein the second multicast group ID prevents the mobile station from decoding the second multicast control message.

11. The method of claim 10, wherein the at least one system information message is broadcast on at least every N radio frames, wherein N is an integer.

12. The method of claim 10, wherein the at least one system information message further comprises a sector ID, geographic information, and neighbor information.

13. The method of claim 10, wherein the resource partitioning configuration further comprises a resource pool for uplink messages and traffic to the base station.

14. The method of claim 13, wherein the resource pool for uplink messages and traffic to the base station is the remainder of uplink resources not included in the one or more feedback partitions and the first signaling partition in the first time interval.

15. The method of claim 13, wherein the uplink resource assignment and the second uplink resource assignment are reassignable each time interval.

16. The method of claim 15, wherein uplink resource assignments are on an on demand basis and for one or more time intervals.

17. The method of claim 10, further comprising:
receiving a downlink assignment, wherein a downlink resource pool is established, wherein the downlink resource pool is divided into a plurality of physical layer downlink allocation units usable for wirelessly transmitting downlink control information or downlink traffic data, wherein the physical layer of the downlink is based on a broadband OFDM technology, wherein the downlink assignment comprises downlink allocation units for the wireless transmission of the downlink control information or downlink traffic data, wherein the downlink allocation units are arranged into time intervals, wherein the assigned downlink allocation units are reassignable each time interval.

18. The method of claim 17, further comprising:
receiving a portion of the downlink control information defining how an interval is decoded on reserved predetermined quantity of downlink allocation units.

* * * * *